United States Patent [19]

Kaye

[11] Patent Number: 4,872,310

[45] Date of Patent: Oct. 10, 1989

[54] ELECTRO-HYDRAULIC ACTUATOR ASSEMBLY

[75] Inventor: Arthur Kaye, Freckleton, United Kingdom

[73] Assignee: British Aerospace, PLC, London, England

[21] Appl. No.: 132,339

[22] Filed: Dec. 14, 1987

[30] Foreign Application Priority Data

Dec. 12, 1986 [GB] United Kingdom ................. 8629750

[51] Int. Cl.[4] ................................................ B60T 7/00

[52] U.S. Cl. ........................................ 60/567; 60/572; 60/581

[58] Field of Search ................. 60/567, 571, 572, 581, 60/594, 39.281

[56] References Cited

U.S. PATENT DOCUMENTS

| | | | |
|---|---|---|---|
| 1,894,055 | 1/1933 | Perkins | 60/572 |
| 2,431,706 | 12/1947 | Nisbet et al. | 60/567 |
| 2,482,792 | 9/1949 | Owen | 60/571 X |
| 2,540,879 | 2/1951 | Hebel et al. | 60/572 |
| 2,544,134 | 3/1951 | Clark | 60/572 |
| 2,585,389 | 2/1952 | Kehrl | 60/572 |
| 2,604,757 | 7/1952 | Wulleman | 60/572 |
| 3,299,637 | 1/1967 | Ballard | 60/572 |
| 3,579,989 | 5/1971 | Stark et al. | 60/567 |
| 3,911,677 | 10/1975 | Collins | 60/911 X |
| 4,475,442 | 10/1984 | Breeden | 91/461 |

FOREIGN PATENT DOCUMENTS

| | | | |
|---|---|---|---|
| 0081703 | 6/1983 | European Pat. Off. . | |
| 0140668 | 5/1985 | European Pat. Off. . | |
| 971491 | 2/1959 | Fed. Rep. of Germany | 60/571 |
| 14456 | of 1888 | United Kingdom | 60/571 |
| 636217 | 4/1950 | United Kingdom . | |
| 2091908 | 8/1982 | United Kingdom . | |

*Primary Examiner*—Edward K. Look

*Attorney, Agent, or Firm*—Kerkam, Stowell, Kondracki & Clarke

[57] ABSTRACT

An electro-hydraulic actuator assembly comprises a master piston-and-cylinder 32, 42 connected to be driven by a rotary actuator 56 and hydraulically connected to a slave master piston-and-cylinder 12 coupled to an output member, e.g. a throttle linkage rod 10, for automatic control of the displacement of the member 10. An override for manual control of the member 10 is provided by a valve 60 which, when opened, hydraulically shortcircuits the member 10 by equalizing pressures on the two sides of the slave piston 16. To re-establish automatic control and synchronize master and slave, a (possibly remote) controller 80 shuts the valve 60 and drives the actuator 56 until master and slave pistons both attain end positions; if necessary, by re-opening valve 60 for a short time and continuing to drive the actuator 56.

9 Claims, 2 Drawing Sheets

ELECTRO-HYDRAULIC ACTUATOR ASSEMBLY

Figure 1:
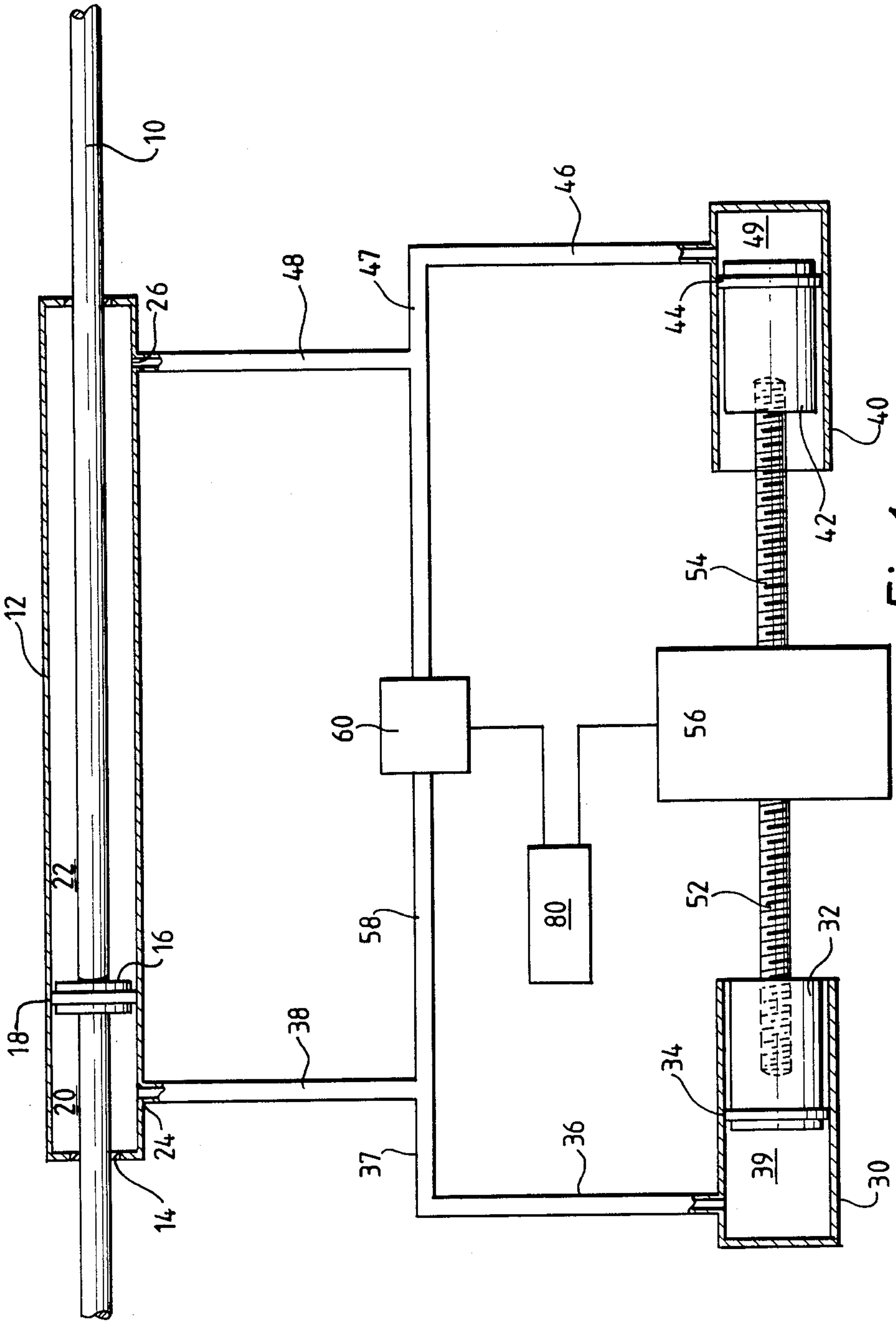

This invention concerns an electro-hydraulic actuator assembly intended to produce linear motion of an output member from a rotary actuator or a drive motor (hereafter 'rotary actuator' will be used to cover both these terms) and vice versa, i.e. unimpeded linear input without the need mechanically to disconnect the output member from the actuator motor.

One particularly advantageous (but not exclusive) area of application of the invention is where the output member is a rod forming part of an aircraft automatic throttle mechanism. In certain circumstances it would be desirable to have available a manual override to the normally computer-controlled automatic throttle system, e.g. where suddenly an obstruction on the runway is observed by the aircraft pilot. Furthermore, it is desired to make such manual overrides relatively inexpensive as compared with the cost of providing linear stepper motors and digital controllers. The invention seeks to provide an electro-hydraulic actuator assembly which enables these desiderata to be met.

Another area of application is in retro-fitting such an electro-hydraulic actuator assembly to a power plant utilizing pure hydraulic actuators which may be used to operate aerofoil surfaces or airbrake-deploying circuits of aircraft. One of the disadvantages of existing purely hydraulic systems in this area of application is that they at all times require engine power offtake even when the actuators are not driven, thus causing a permanent drain of engine power. The present invention seeks to overcome this disadvantage.

According to one aspect of this invention, there is provided an electro-hydraulic actuator assembly, comprising, master piston-and-cylinder means connected to said rotary actuator and having two hydraulic fluid delivery ports, a slave piston-and-cylinder having inlets disposed on opposite sides of the piston thereof and being hydraulically connected to said ports by way of respective fluid flow paths, the said slave piston being mechanically coupled to an output member, the position of which it is desired to control, and override means for overriding automatic control of the slave piston-and-cylinder unit, said override means including a by-pass duct connected between said flow paths, and an electrically operable valve means connected in said by-pass duct such that when said valve means is opened, hydraulic pressure on the two sides of the slave piston is equalized, whereby control of the position of said output member is decoupled from said rotary actuator, said valve means having a control input connected to an output of controller means which has input means for connection to first and second position signalling means for respectively providing signals from said output member and said actuator, the controller means being responsive to any difference between said signals so as to de-energize said valve means and thereby to effect decoupling until said difference is eliminated, whereupon the controller means is effective to cause said valve means to be energized.

Preferably, said master piston-and-cylinder means comprises a pair of master cylinders in each of which a piston is slidably mounted, each piston being connected by a screw jack to a common rotary actuator or drive motor such that when one piston is driven into its cylinder, the other piston is withdrawn from its cylinder.

The rotary actuator or drive motor and the pair of master cylinders may be accommodated in one casing, and said by-pass duct with said valve means is disposed externally of said casing.

In an alternative preferred embodiment, said master piston-and-cylinder means comprises a single piston-and-cylinder unit, there being sealing means within the cylinder co-operating at all times with the outer surface of the piston to divide the cylinder into two cylinder spaces which are each connected to a different one of said delivery ports.

Preferably, said by-pass duct with said valve means is disposed in the casing of said single piston-and-cylinder unit.

One end of the piston may be connected to a drive motor or to a said actuator via a screw jack, the other end of the piston being connected, directly or indirectly, to said member.

Said valve means may be controlled by the output of a control unit which has inputs connected to two absolute position encoders respectively providing signals from said output member and a drive motor or said actuator, any difference between said signals being effective to de-energise said valve means to effect decoupling until said difference is eliminated, whereupon the said valve means is re-energised.

Preferably, automatic synchronisation means are provided to re-synchronise the master and slave cylinder-and-piston means, said synchronisation means including a control unit for closing said valve means on selection of automatic mode of operation and for driving said actuator, first means for signalling to said control unit when said slave piston reaches an end position, and second means for signalling to said control unit when the or each master piston reaches an end position, said control unit being effective to re-open said valve means and to continue driving said actuator until said second means signals the attainment of an end position, whereupon said control unit is effective to close said valve means again.

In one preferred embodiment, the said member is a throttle linkage member of an aircraft automatic throttle mechanism, whereby on decoupling from said actuator the said member may be displaced manually.

In another preferred embodiment, the said member forms part of an aerofoil surface operating mechanism.

The invention also extends to aircraft provided with an aerofoil surface operating mechanism and/or an automatic throttle mechanism including an electro-hydraulic actuator assembly.

Figure 2:
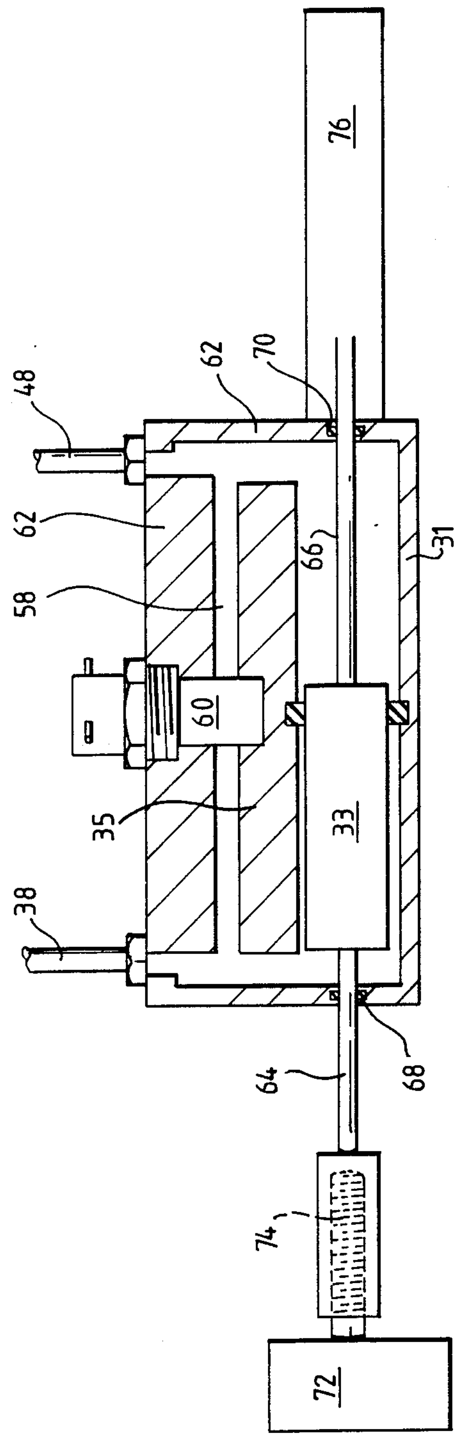

Two preferred embodiments of the invention will now be described, purely by way of example, with reference to the accompanying diagrammatic drawings, wherein:

FIG. 1 is a connection scheme or hydraulic circuit diagram of an electro-hydraulic actuator assembly according to a first embodiment of the invention; and FIG. 2 is similar to FIG. 1 but shows a second embodiment of the invention, with certain parts (as explained below) omitted for clarity.

In the Figures, like reference numbers designate like parts.

Referring first to FIG. 1, there is shown an output member in the form of a rod 10 forming part of an aircraft automatic throttle linkage, not shown. The rod 10 traverses a hydraulic slave cylinder 12 which has O-ring seals 14 around the apertures in its end faces through which the rod passes. The rod 10 is rigidly connected to a double-acting piston 16 slidable in the cylinder 12. The outer surface of the piston 16 carries a seal 18 engaging with the inner surface of the cylinder 12, whereby the interior of the latter is divided into two cylinder or pressure spaces 20, 22. Each space 20, 22 has a respective hydraulic fluid inlet/outlet port 24, 26. Thus, by pressurising one space 20 or 22 of the slave cylinder, the piston 16 moves to reduce the volume of the other space 22 or 20, respectively.

The slave cylinder 12 is hydraulically connected by ducting to two master cylinders 30, 40. Each master cylinder 30, 40 has a respective piston 32, 42 slidable therein and engaging the inner surface of the cylinder 30, 40 by way of respective seals 34, 44. Each cylinder 30, 40 has a hydraulic delivery port 35, 45 respectively connected by pipe sections 36, 46; 37, 47; and 38, 48 to the inlet/outlet ports 24, 26 of the slave cylinder 12.

Each master piston 32, 42 has an active or working surface defining with the respective master cylinder 30, 40 a hydraulic pressure chamber 39, 49. The face of each piston 32, 42 remote from the active/working surface is connected to a respective screw jack 52, 54. The screw jacks 52, 54 are connected to be driven by a common, single rotary actuator 56 (or, in a nonillustrated embodiment, a drive motor), the arrangement being such that when one of the pistons, say 32, is driven into its cylinder 30 the other piston 42 is withdrawn from its cylinder 40, and vice versa.

The master cylinders 30, 40 and the rotary actuator 56 re built together into a common casing.

The junctions of pipe sections 37, 47; 38, 48 are connected for flow communication by a by-pass duct 58. A solenoid-operated shut-off valve (SOV) 60 is mounted in this duct 58 and is deenergized in the automatic mode of operation of the throttle mechanism so that the SOV 60 is shut and no hydraulic fluid flow occurs in the duct 58.

When it is desired to override the automatic mode of operation to a manual mode, a controller 80 energizes the SOV 60 to open the duct 58 to hydraulic fluid flow between the branches of the hydraulic circuit on either side of piston 16. Pressures in the two slave cylinder pressure spaces 20, 22 will be equalized and the piston 16 together with the rod 10 will be de-coupled from the control of the actuator 56. A nonillustrated handle attached to the rod 10 may now be used by the pilot to operate the throttle linkage manually.

The manual mode of operation may be controlled by providing detents (not shown) in the range of handle movement, whereby the SOV 60 is momentarily closed on attaining a detent to stop hydraulic flow in the duct 58.

The embodiment of FIG. 2 differs from that of FIG. 1 only in the following respects. The slave cylinder 12 and the rod 10 have been omitted for clarity. There is only one master cylinder 31, with a single, double-acting piston 33. A seal 35 divides the cylinder 31 into two pressure spaces 39, 49, the seal 35 being fixed in the cylinder 31 and engaging the central region of the outer surface of the piston 33. The by-pass duct 58 with the SOV 60 are mounted in a casing 62 which is integral with the cylinder 31.

Piston rods 64, 66 are connected to the piston 33 and extend out of opposite ends of the cylinder 31 via O-ring seals 68, 70. The piston rod 64 is actuted from a drive motor 72 via a screw jack 74, while the piston rod 66 is connected to a linear voltage differential transformer 76, serving as a position sensor.

When in either of the above-described embodiments it is desired to change back from manual to automatic mode of operation, it is necessary to synchronise the actuator 56 or drive motor 72 and the output member, i.e. rod 10. Synchronisation may be achieved by providing respective absolute position encoders or microswitches (not shown) connected to the actuator or motor and to the rod 10. The output signals of the encoders are passed to a SOV controller 80. Any difference in these signals is arranged to cause the controller 80 to deenergize the SOV 60, i.e. to open it and thus the by-pass duct 58. The actuator 56 or motor 72 is then driven until the signal discrepancy becomes zero, whereupon the SOV 60 is energized shut and throttle rod control passes back to the automatic mode.

One mode of automatic, and optionally remotely actuatable, synchronisation of slave and master will now be more particularly described, for FIG. 1 only; the application to FIG. 2 will be obvious to a person skilled in the art.

Referring again to FIG. 1, let it be assumed that the rod 10 has attained a given position, say with the engine idling, under manual control. Hence double acting piston 16 will be at a corresponding position within the slave cylinder 12. SOV 60 has been open during manual control so that master pistons 32 and 42 will not have followed the movements of the rod 10 and will not occupy positions corresponding to the piston 16 in slave cylinder 12.

The controller 80 is now caused to send a control signal, which may be a remote control signal, which shuts the SOV 60, so that movements of the master pistons 32, 42 will now be followed again by the slave piston 16. This control signal is arranged also to establish (remote) control of the rotary actuator 56, and to drive the actuator 56, the hence the master pistons 32, 42, until either the slave piston 16 reached an end-stop, or the master pistons 32, 42 reach an end stop as detected by the position encoders, microswitches etc. If the slave piston 16 meets the end stop first before master pistons 32, 42 have reached a corresponding end-stop, the SOV 60 is re-opened by the control unit 80 and the actuator 56 is instructed to continue driving the master pistons 32, 42 until they do reach such a corresponding end-stop. Alternatively, if the master pistons 32, 42 reach the end stop before the slave piston 16, the controller 80 reverses the actuator 56, (the SOV 60 being open) for a very short period, e.g. one second. The SOV 60 will then close, the motor/actuator will re-reverse to drive in the original direction until the slave piston 16 does meet an end stop.

It will be appreciated that in either case described above the master and slave pistons are now synchronised in that they both occupy end-stop positions. The SOV 60 then receives a signal to close again, whereupon all further movement demands on actuator 56 are faithfully followed by the slave 16 and hence by the rod 10. The synchronisation process takes less than 1 second. Up to 7 seconds is acceptable for a gas-turbine throttle box application, because engine r.p.m. on a gas-turbine responds relatively slowly to throttle movements and will not be affected by the momentary return of the slave 16 to an end-stop position for synchronisation purposes provided the operation can be performed in under 7 seconds. The SOV 60 may thus be a form of, optionally remotely activated, hydraulic 'lock'.

What is claimed:

1. An electro-hydraulic actuator assembly, comprising a rotary actuator, master piston-and-cylinder means connected to said rotary actuator and having two hydraulic fluid delivery ports, a slave piston-and-cylinder having inlets disposed on opposite sides of the piston thereof and being hydraulically connected to said ports by way of respective fluid flow paths, the slave piston being mechanically coupled to an output member, the position of which it is desired to control, and override means for overriding automatic control of the slave piston-and-cylinder, said override means including a by-pass duct connected between said flow paths, and an electrically operable valve means connected in said by-pass duct such that when said valve means is opened hydraulic pressure on two sides of the slave piston is equalized, whereby control of the position of said output member is decoupled from said rotary actuator, said valve means having a control input connected to an output of controller means which has input means for connection to first and second position signalling means for respectively providing signals from said output member and said actuator, the controller means being responsive to any difference between said signals so as to de-energize said valve means and thereby to effect decoupling until said difference is eliminated, whereupon the controller means is effective to cause said valve means to be energized.

2. An assembly according to claim 1, wherein said master piston-and-cylinder means comprises a pair of master cylinders in each of which a piston is slidably mounted, each piston being connected by a screw jack to a common rotary actuator such that when one piston is driven into its cylinder, the other piston is withdrawn from its cylinder.

3. An assembly according to claim 1, wherein said rotary actuator and the master piston-and-cylinder means are accommodated in one casing, and said by-pass duct with said valve means is disposed externally of said casing.

4. An assembly according to claim 1, wherein said master piston-and-cylinder means comprises a single piston-and-cylinder unit, there being sealing means within the cylinder co-operating at all times with the outer surface of the piston to divide the cylinder into two cylinder spaces which are each connected to a different one of said delivery ports.

5. An assembly according to claim 1, wherein said by-pass duct with said valve means is disposed in the casing of said single piston-and-cylinder unit.

6. An assembly as claimed in claim 1, wherein automatic synchronization means are provided to re-synchronize the master and slave cylinder-and-piston means, said synchronization means including said controller means adapted for closing said valve means on selection of an automatic mode of operation and for driving said actuator, and wherein the first position signalling means is adapted to signal to said controller means when said slave piston reaches an end position, and the second position signalling means is adapted to signal to said controller means when the or each master piston reaches an end position, said controller means being effective to re-open said valve means and to continue driving said actuator until said second position signalling means signals the attainment of an end position, whereupon said controller means is effective to close said valve means again.

7. An assembly as claimed in claim 1, wherein said controller means is remote from the assembly.

8. An assembly according to claim 1, wherein the said member is a throttle linkage member of an aircraft automatic throttle mechanism and said override means includes a throttle handle mechanically connected to said throttle linkage.

9. An assembly according to claim 1, wherein said master piston-and-cylinder means comprises a single cylinder in which a single double-faced piston is slidably mounted and one face of the master piston is connected to said actuator via a screw jack and the other face of the piston is connected to said second position signalling means comprising linear position indicating means for indicating the position of said piston relative to a datum point.

* * * * *